United States Patent
Wagner-Stuerz

(10) Patent No.: US 10,851,912 B2
(45) Date of Patent: Dec. 1, 2020

(54) DETECTING INADEQUATE VALVE SEAT INTEGRITY OF A CONTROL VALVE

(71) Applicant: SAMSON AKTIENGESELLSCHAFT, Frankfurt am Main (DE)

(72) Inventor: David Wagner-Stuerz, Muehltal (DE)

(73) Assignee: SAMSON AKTIENGESELLSCHAFT, Frankfurt am Main (DE)

( * ) Notice: Subject to any disclaimer, the term of this patent is extended or adjusted under 35 U.S.C. 154(b) by 0 days.

(21) Appl. No.: 16/444,962

(22) Filed: Jun. 18, 2019

(65) Prior Publication Data

US 2019/0383422 A1 Dec. 19, 2019

(30) Foreign Application Priority Data

Jun. 19, 2018 (DE) ........................ 10 2018 114 710

(51) Int. Cl.
| | |
|---|---|
| *F16K 1/42* | (2006.01) |
| *G08B 13/08* | (2006.01) |
| *G08B 21/24* | (2006.01) |
| *F16K 37/00* | (2006.01) |
| *G08B 21/18* | (2006.01) |

(52) U.S. Cl.
CPC ........ *F16K 37/0041* (2013.01); *G08B 21/182* (2013.01); *F16K 1/42* (2013.01)

(58) Field of Classification Search
CPC ..................................................... F02B 75/34
See application file for complete search history.

(56) References Cited

U.S. PATENT DOCUMENTS

| | | | |
|---|---|---|---|
| 4,590,963 A | | 5/1986 | Gardner et al. |
| 5,594,175 A | * | 1/1997 | Lyon ....................... F16K 31/04 |
| | | | 73/593 |
| 6,360,773 B1 | | 3/2002 | Rhodes |
| 7,406,399 B2 | * | 7/2008 | Furem ................ G05B 23/0235 |
| | | | 702/182 |

(Continued)

FOREIGN PATENT DOCUMENTS

| | | |
|---|---|---|
| DE | 10257910 B3 | 8/2004 |
| DE | 10310874 | 9/2004 |

(Continued)

*Primary Examiner* — Joseph H Feild
*Assistant Examiner* — Pameshanand Mahase
(74) *Attorney, Agent, or Firm* — Steven M. Shape; Dennemeyer & Associates, LLC

(57) ABSTRACT

A method is detect inadequate valve seat integrity in a control element of a control valve is proposed, wherein during a calibration time interval the position of the control element of the control valve in the closed position are repeatedly measured and recorded. Measuring of the position in the closed position continues during operation, and a moving average value is determined over a specified number of values. A threshold is determined from the calibration data set and the specified number. If the moving average deviates from the average of the calibration data by more than this threshold, a message is output. In particular, no additional sensors or scanning devices are required and a sensible compromise between early fault detection and avoidance of false diagnoses is achieved.

12 Claims, 5 Drawing Sheets

(56) References Cited

U.S. PATENT DOCUMENTS

| | | | | |
|---|---|---|---|---|
| 8,265,794 B2* | 9/2012 | Minervini | ........... | F16K 37/0091 |
| | | | | 700/282 |
| 2009/0306830 A1* | 12/2009 | Cummings | ........ | G05B 23/0283 |
| | | | | 700/282 |
| 2014/0305525 A1* | 10/2014 | Le Moing | ........... | F16K 37/0083 |
| | | | | 137/553 |
| 2018/0163896 A1* | 6/2018 | Mueller | .............. | F16K 37/0091 |

FOREIGN PATENT DOCUMENTS

| EP | 0315391 | 5/1989 |
|---|---|---|
| EP | 0637713 A1 | 2/1995 |
| EP | 2646723 | 10/2013 |

* cited by examiner

DETECTING INADEQUATE VALVE SEAT INTEGRITY OF A CONTROL VALVE

CROSS-REFERENCE TO RELATED APPLICATIONS

This application claims priority to German application 102018114710.4, filed Jun. 19, 2018, which is hereby incorporated by reference in its entirety.

FIELD OF THE INVENTION

The invention concerns a method for detecting inadequate valve seat integrity of a control valve, as well as a control valve with corresponding means.

Control valves, also known as process valves, consist of a movable control element or valve element and an opening in the valve body. The valve element is capable of either partially or completely opening or closing this opening. When closed, the valve should close as tightly as possible. For the definition of tightness, there are tightness classes. There are different sealing seat designs to ensure that the appropriate tightness classes are maintained. In most cases, the valve element has an annular contour which engages in a special seat ring inside the housing. Soft-sealing seat sealing elements can only be used at low temperatures and low pressure differences. Hard valve seat designs (e.g. hardened steel, stellite, ceramics) are suitable for more demanding applications. For control valves with high tightness classes, it is particularly important that over a certain period of time (maintenance interval) the sealing surface of the control element and the seat edge of the housing seat are only subjected to so much wear that the desired tightness class is maintained. However, since the seat contours are located inside the valve, visual checking of the seat integrity cannot be performed. It is also very difficult to determine the flow rate of a very small leakage.

DESCRIPTION OF RELATED ART

EP 2 646 723 B1 describes a method for measuring the integrity of a valve seat which compares the setpoint control signal with the actual position and uses a force sensor to determine the seat integrity. This requires a force sensor for force measurement at the valve element.

Publication EP 315 391 B1 describes several scanning systems in which scanning values are compared with reference values in order to detect deviations during operation of a valve. The disadvantage is that either additional force sensors or additional scanning devices are required in order to conclude that the valve is wearing out.

OBJECT OF THE INVENTION

The object of the invention is to provide methods and devices for detecting inadequate valve seat integrity in a control valve without the need for additional sensors or scanning devices.

BRIEF SUMMARY OF THE INVENTION

This object is achieved by the inventions as claimed in the independent claims. Advantageous embodiments are described in the dependent claims. The wording of all claims is hereby incorporated into the description by reference.

The use of the singular shall not exclude the plural, which shall also apply in the opposite sense, unless otherwise disclosed.

In what follows, individual steps of a method will be described in more detail. The steps do not necessarily have to be performed in the order given in the text. Also, further steps not explicitly stated may be part of the method.

To achieve the object, a method for detecting inadequate valve seat integrity of a control valve having a control element is proposed, comprising the following steps:

To obtain a calibration data set, the position of the control element of the control valve in the closed position is repeatedly measured and recorded during a time interval. The position sensor usually present on the process valve is sufficient for the measurement. Therefore, no additional sensor is required. The mean value and the standard deviation of the position of the control element in the closed position are calculated from this calibration data set. The time interval is selected such that all different occurring process states (process noise) in which the valve assumes the closed position are taken into account. The process-related fluctuation of the position of the valve element in the closed position is therefore recorded by the calibration data set.

During continued operation of the control valve, the position of the control element in the closed position is measured and recorded. This measurement is preferably performed permanently and continuously as long as the system or plant is running. A moving average is continuously determined over a specified number of positions measured during further operation. This moving average naturally fluctuates much less than the process noise, resulting in a significantly higher confidence level. A threshold for the moving average is determined from the mean value and the standard deviation of the position of the control element from the calibration data set and the specified number. If the moving average deviates from the calibration data set by more than this threshold, a message is output since the valve seat integrity of the valve seat of the process valve may have suffered. A detected displacement of the zero point position of the valve element in the closed valve position therefore indicates wear of the seat.

Typically, the standard deviation of the moving average is used as the threshold. This is obtained, for example, by dividing the standard deviation of the position of the control element in the closed position, which can be determined from the calibration data set, by the root of the specified number. However, other thresholds are also conceivable, e.g. n times this standard deviation of the moving average. Frequently n=3 is selected (so-called 3 sigma threshold).

In addition, an absolute threshold can be defined from the calibration data set if necessary: This results from the maximum and/or minimum during the time interval for measuring the calibration data set. It is assumed that no irregularities occur in this calibration time interval, but that the entire bandwidth of normal process states is covered. This absolute threshold can be of interest when viewing individual data points and can also be used as an additional criterion.

The method works best if the control valve has a hard valve seat.

Preferably, the specified threshold is defined by a confidence interval of the moving average, for example the 90% or 95% confidence interval. This allows a mathematically sensible compromise to be reached between early fault detection and avoidance of false diagnoses.

If within a further time interval the moving average deviates multiple times by more than the threshold from the average value of the calibration data set, a straight line can be formed from the positions measured within the further time interval, wherein the gradient and the axis section of the straight line are determined. A message is output if the value of the gradient of the straight line is greater than the quotient of the threshold and the length of the further time interval and/or if the axis section deviates from a calibration axis section of the calibration data set by more than the threshold.

This makes it particularly easy to distinguish an error in the closing position of the control valve from process noise. In addition, it may be possible to more accurately analyze why the seat integrity of the valve has deteriorated, and it may even be possible to determine when an error condition started.

A message can also be output if a new measured value deviates from the previous measured value by more than the standard deviation of the position of the control element from the calibration data set during the continued measurement of the position of the control element in the closed position. This is particularly advantageous if the closing position of the valve changes abruptly.

The implementation of the proposed method is particularly simple and secure if the control valve has a control module and the method is performed on the control module of the control valve. In particular, network access to the valve control is not necessary, so that complex safety precautions to ensure network security, e.g. to prevent hacker attacks, can be omitted.

For the management of a plant with a plurality of valves, or also with valves which are difficult to access and whose regular control is associated with special effort, it is particularly favourable if the method runs on at least one device which is connected via a network to the control module of the control valve. The at least one device can, for example, be computers in the so-called cloud. The monitoring of the valves can thus take place centrally, if necessary at a remote location, and no great effort is required to carry out complex calculations and/or analyses with the data.

The object is also achieved by a control valve having means for performing a method as described above.

The object is also achieved by a control valve, with means for measuring and recording the position of the valve element in the closed position, whereby the position of the valve element can be measured and recorded each time the closed position is entered. Further comprising means for calculating an average value, a moving average and an associated standard deviation from recorded positions and means for determining and/or specifying time intervals, wherein during a time interval the position of the control element of the control valve in the closed position can be repeatedly measured and recorded to obtain a calibration data set. The mean value and the standard deviation of the position of the control element in the closed position can be calculated from the calibration data set, wherein a moving average can be continuously determined over a predetermined number of measured positions, and wherein a threshold for the moving average can be determined from the mean value and the standard deviation of the position of the control element from the calibration data set and the predetermined number. In addition, the control valve has means for outputting a message which are configured to output a message of inadequate seat integrity when the moving average deviates by more than the threshold from the mean value of the calibration data set.

The control valve is particularly simple and secure (e.g. with regard to network security) if a control module is present, the means for measuring and recording the position of the valve member in the closed position, for calculating a mean value, a moving average and an associated standard deviation from recorded positions, for determining and/or specifying time intervals, and for outputting a message being provided by the control module.

Centralized monitoring, and comparatively low effort in possibly required complex calculations and/or analyses of the data, is achieved if the control valve has a control module, the means for measuring and recording the position of the valve member in the closed position, for calculating a mean value, a sliding average and an associated standard deviation from recorded positions, for determining and/or specifying time intervals, and for outputting a message being provided by at least one device connected to the control module via a network. The at least one device may be a computers in a cloud, for example.

The object is further achieved by the method steps of a method as described above being formulated as program code, with which the method is executable on at least one computer.

The object is further achieved by a computer program comprising executable instructions, which perform the method according to one of the preceding method claims when executed on a processing unit, a microcontroller, DSP, FPGA or computer or on a plurality thereof in a network.

Further, the object is achieved by a computer program comprising program code means for performing the inventive method according to one of the embodiments thereof when the computer program is executed on a processing unit, a microcontroller, DSP, FPGA or computer or on a plurality thereof in a network. In particular, the program code means may be instructions stored on a computer-readable data storage medium.

The object is further achieved by a storage medium, on which a data structure is stored, wherein said data structure performs the inventive method according to one of the embodiments thereof after having been loaded into a main and/or working memory of a processing unit, a microcontroller, DSP, FPGA or computer or of a plurality thereof in a network.

The object is also achieved by a computer program product having program code means stored on a machine-readable storage medium in order to perform the inventive method according to one of the embodiments thereof when the program is executed on a processing unit, a microcontroller, DSP, FPGA or computer or on a plurality thereof in a network. Herein, a computer program product refers to the program as saleable commodity. This can be embodied in any conceivable form, for example on paper or a computer-readable data storage medium, and in particular may be distributed via a data distribution network.

Finally, the object is achieved by a modulated data signal comprising instructions executable on a processing unit, a microcontroller, DSP, FPGA or computer or on a plurality thereof in a network, for performing the inventive method according to one of the embodiments thereof.

As computer system for the performing the method, either a single computer or microcontroller, DSPs or FPGAs may be considered, or a network of microcontrollers, DSPs, FPGAs or computers, for example an in-house, closed network, or also computers that are connected to each other via the Internet. Furthermore, the computer system can be realized by a client-server constellation, wherein parts of the invention run on the server, others on a client.

The object is also achieved by a control module for a control valve, which provides means for performing the described method. according to one of the method claims.

Außerdem wird die Aufgabe durch ein Steuermodul für ein Stellventil gelöst, welches Mittel zum Ausführen des beschriebenen Verfahrens bereitstellt. With such a control module, existing control valves can be retrofitted in accordance with the invention.

BRIEF DESCRIPTION OF THE SEVERAL VIEWS OF THE DRAWINGS

Further specifics and features follow can be deduced from the following description of preferred embodiments in conjunction with the subclaims. Therein the respective features may be realised singly or in combination with one another. The possibilities for solving the problem are not limited to the exemplary embodiments. Thus, for example range specifications always comprise all—not specified—intermediate values and all possible sub-intervals.

The exemplary embodiments are shown schematically in the figures. The same reference numerals in the individual figures designate the same or functionally identical or with respect to their functions corresponding elements. Specifically, the figures show the following.

DETAILED DESCRIPTION OF THE INVENTION

Figure 1A:
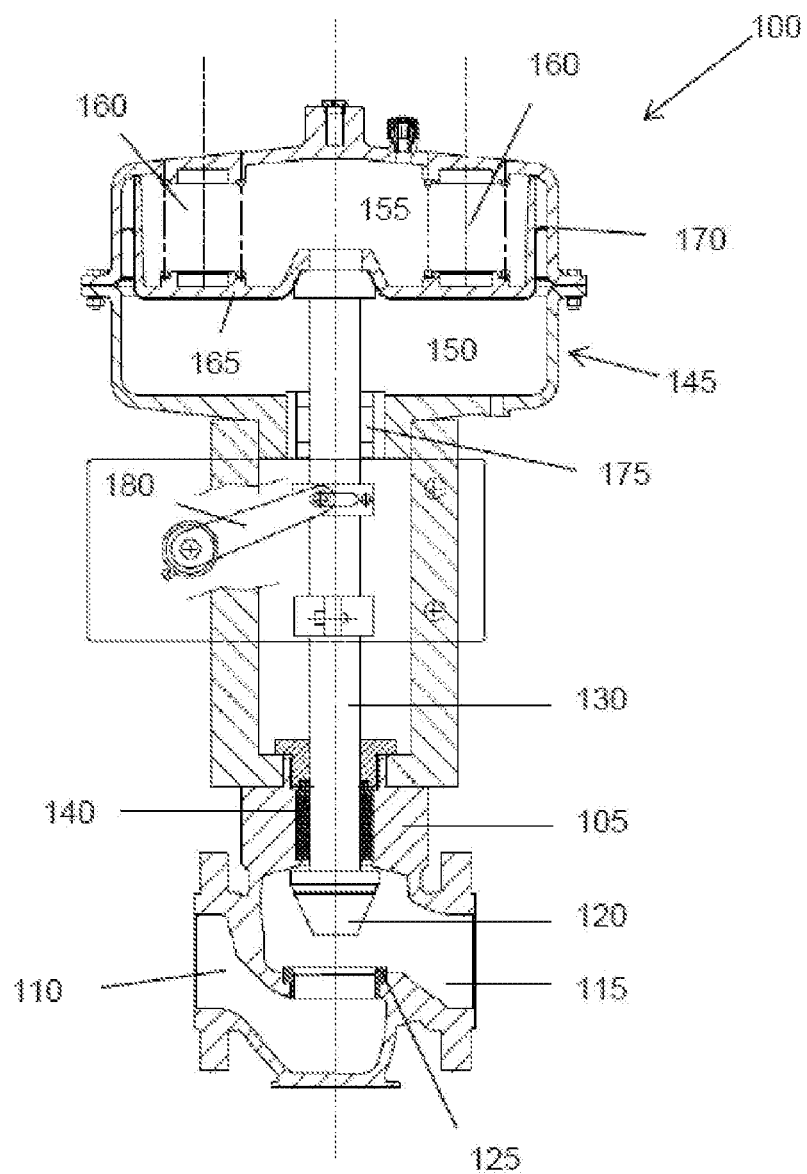
FIG. 1A shows the typical layout of a control valve in an open position.

FIG. 1A shows a typical design of a control valve 100 with a valve body 105. Between the inlet side 110 and the outlet side 115 there is a valve element 120 which can be pressed into the valve seat 125 to throttle the flow of a process fluid flowing from the inlet side 110 to the outlet side 115. The valve stem or actuator stem 130 is used for this purpose. The passage of the valve stem 130 through the fluid-tight valve body 105 is sealed by a seal or stuffing box 140.

At the upper end of the valve stem 130 there is a fluid drive 145, wherein the drive fluid is typically gas. The actuator 145 has two chambers, a lower compressed air chamber 150 and an upper chamber 155, in which springs 160 act on the valve stem 130 via a plate 165. The two chambers 150 and 155 are separated by a membrane 170, the membrane 170 being impermeable to the actuator fluid, typically compressed air. Such a design is referred to as a single-acting pneumatic actuator, since compressed air is introduced into only one chamber, the compressed air chamber 150, and not both. The valve stem 130 must pass through the housing of the actuator 145 and be tight against the actuator fluid. For this purpose, this passage is sealed by a 175 actuator housing seal.

Typically, there is also a signal detector or position sensor 180 on the valve stem 130 to determine the position of the valve member 120.

In FIG. 1A there is sufficient compressed air in the compressed air chamber 150 so that the control valve 100 is open.

Figure 1B:
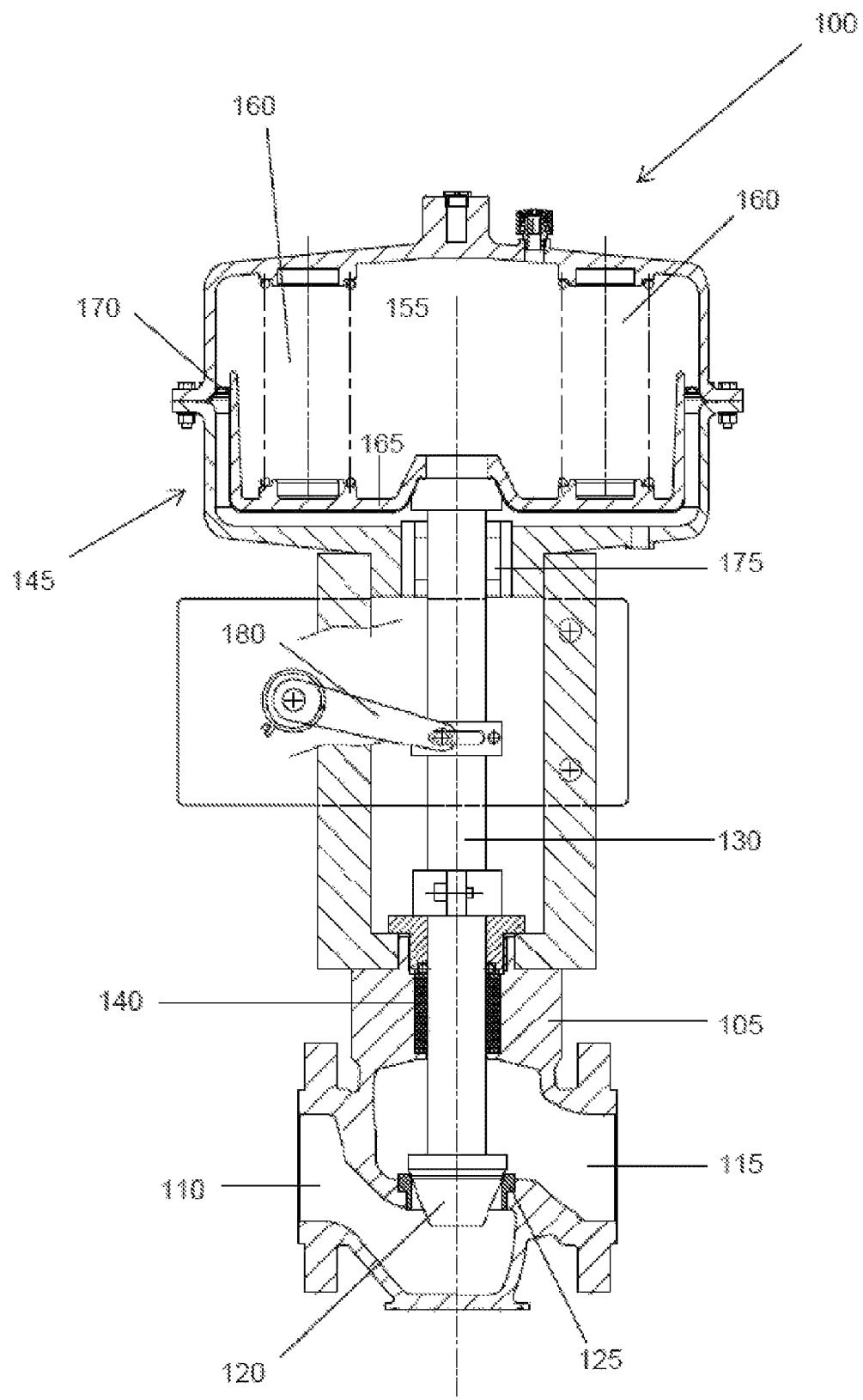
FIG. 1B shows the typical layout of a control valve in the closed position.

In FIG. 1B the compressed air chamber 150 is vented so that the springs 160 could close the control valve 100.

To assess the integrity of the valve seat, the displacement of the zero point position of the valve element in the closed valve position during process operation is measured and from this the wear of the seat is deduced. To measure the position of the valve element, the existing position sensor or signal detector 180 is used. The position sensor or signal detector 180 records and evaluates a large number of waypoints in the closing position of the valve element.

When the control valve is initialized, the control valve is for the first time moved from the open position to the closed position, usually without process pressure because the valve is not yet integrated into the plant.

When the valve is closed for the first time under process conditions, further reference points are recorded. The waypoint histograms obtained are used to evaluate the displacement of the closing point. A comparison of the waypoints during initialization to waypoints under process conditions provides an initial indication of the strain loads on the valve under process conditions. During the running process, waypoints are now recorded, typically at regular intervals, when the valve is closed. The process noise, which corresponds to the changing process conditions of the plant, is determined on the basis of a representative number of waypoints. The process noise is used to calculate a moving average. This continuously formed moving average of the waypoints must not increase or decrease significantly over time during the process. If there is a gradient other than zero, wear of the valve seat can be inferred if the process is unchanged.

Figure 2:
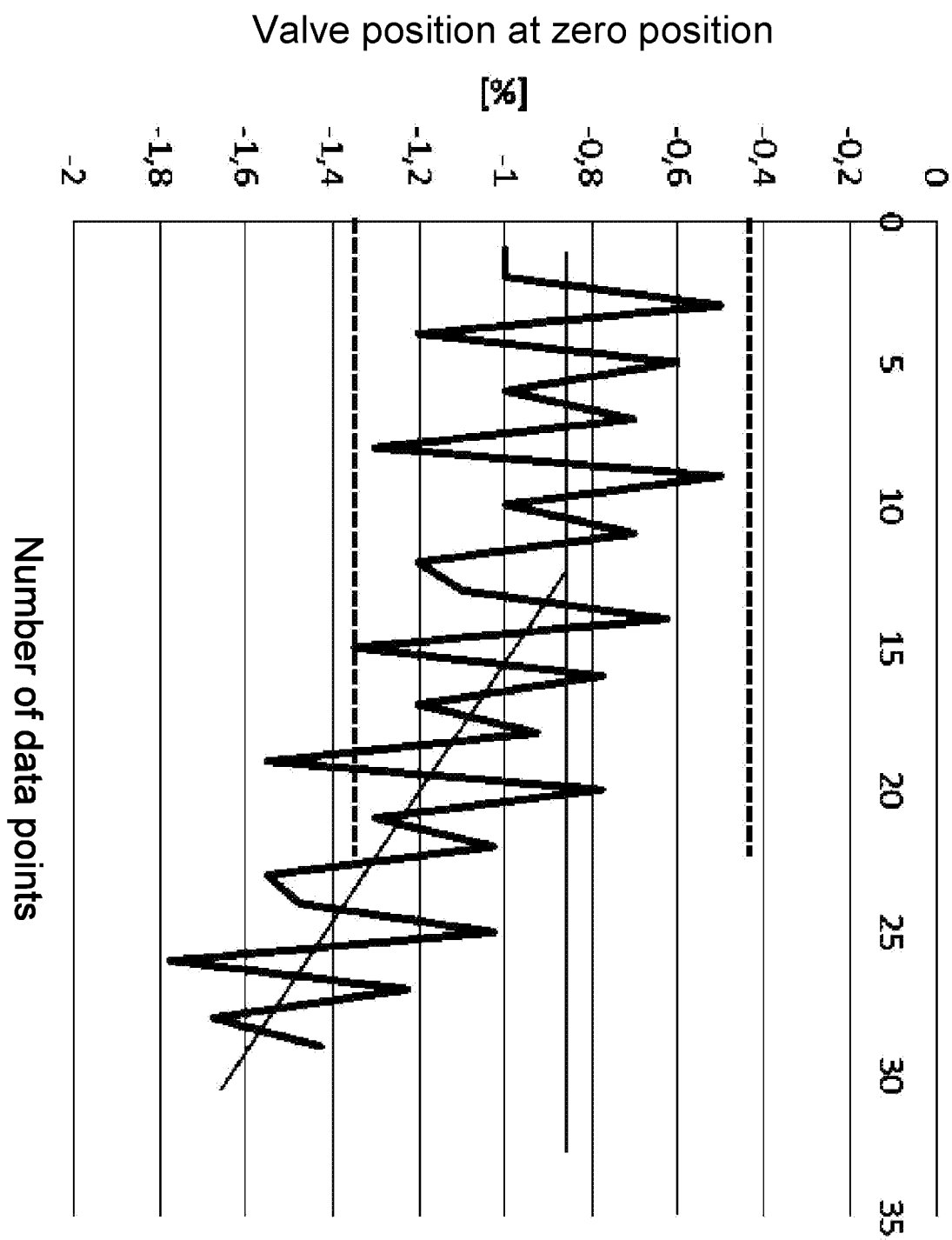
FIG. 2 shows a typical progression of the valve position in the closed position, wherein the position changes gradually.

When determining the moving average, a slow drift of the waypoint position can be detected within the process. This can cause a gradient, as shown in FIG. 2, from which e.g. a wear condition can be deduced.

Figure 3:
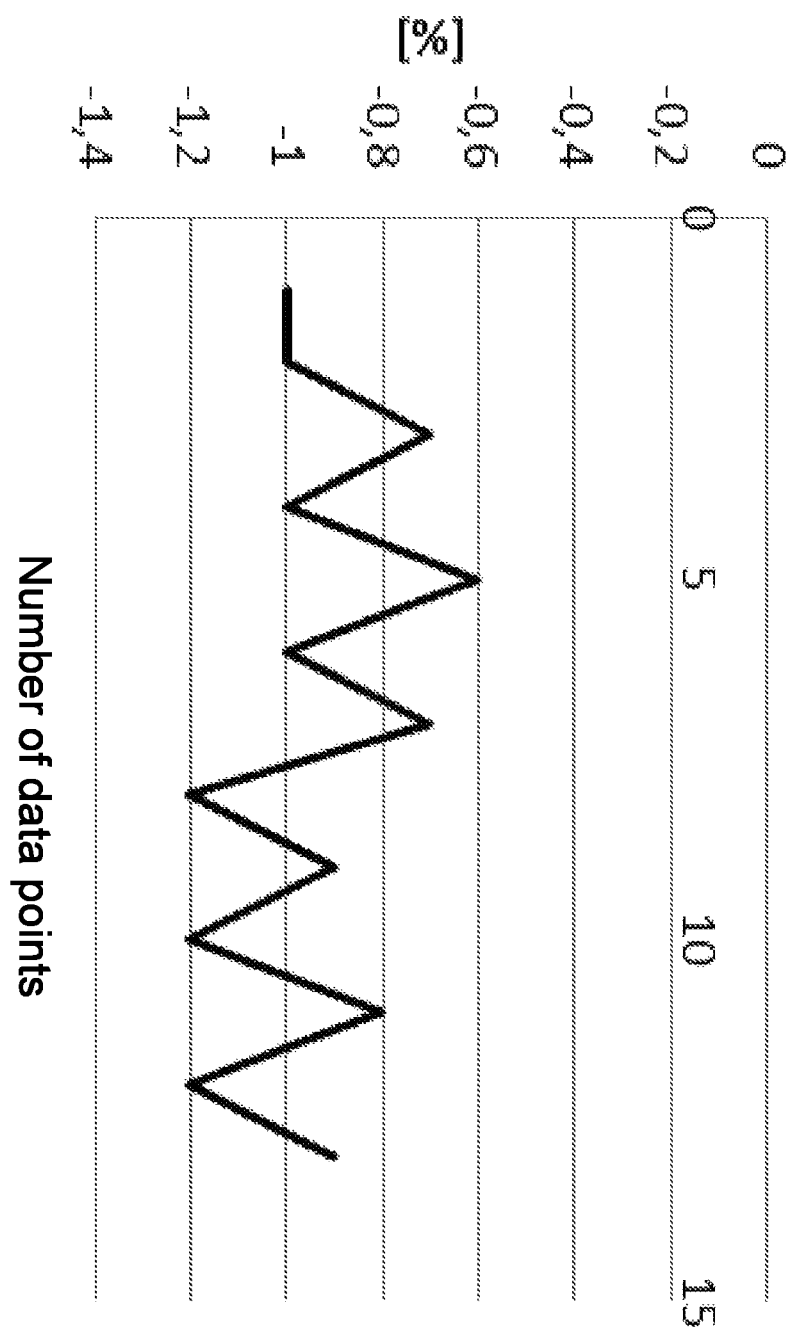
FIG. 3 shows a typical progression of the valve position in the closed position, wherein a sudden change occurs.
Figure 3:
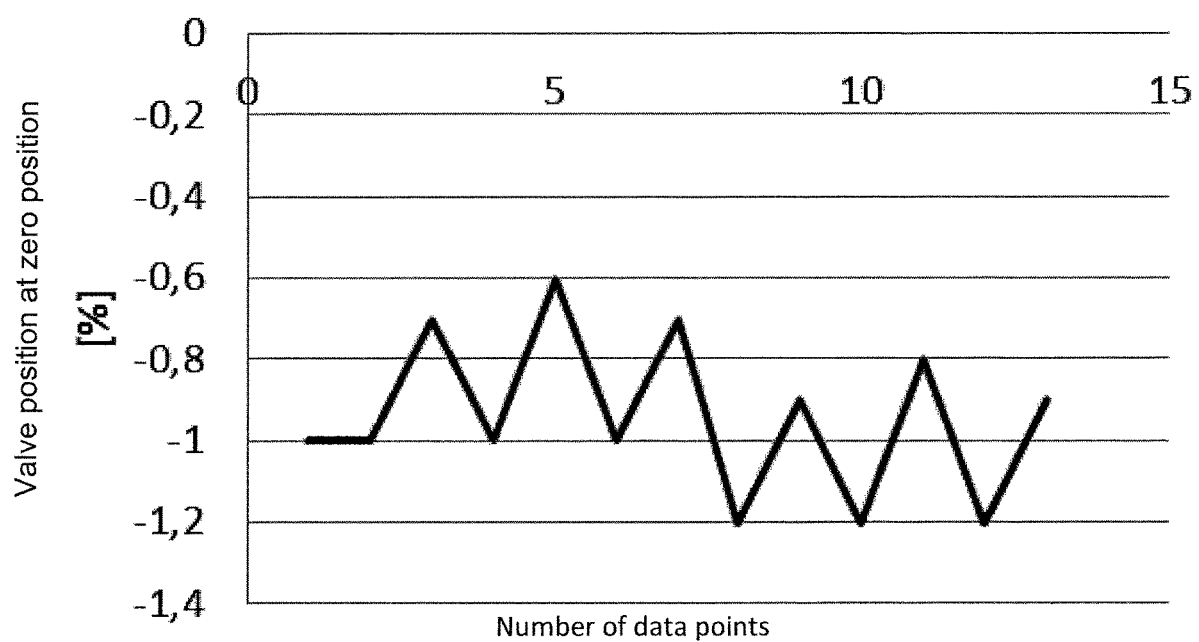

In the case of a sudden change, however, a parallel shift to the reference line occurs, as shown in FIG. 3. If a new measuring point is further distant from a previous measuring point than the process noise, this indicates a sudden error condition. This error is detected immediately.

Even without additional scanning or sensor elements, very precise error detection is thus possible. Smallest shifts of the zero position of the actuator can be detected despite a lack of process knowledge. The filtering out of the process noise allows very precise measuring point analyses.

It is usual to compare the actual progression with fixed reference waypoints or curves. However, a process correction does not take place in this case, so that only very large displacements of the zero position are reliably detected. The procedure described herein increases process reliability, as wear, e.g. on the valve seat and/or valve plug, is detected earlier. Although no process data or data on the pressure force of the closing element is required, wear on the valve seat can be inferred.

Glossary

Moving Average

The moving average is a method of smoothing time series or data series. Smoothing is performed by removing higher frequency components. As a result, a new datapoint set is created, which consists of the mean values of equally large subsets of the original datapoint set.

The set of moving average values is calculated iteratively ("moving") over a section, the "window", of a given signal. The window used is shifted in an overlapping fashion, i.e. the first value is repeatedly deleted from the section in question, the first value from after the section is added and a new mean value is calculated.

For the calculation of the mean value, the values occurring in the window can then be weighted arbitrarily.

The moving average is used, for example, for the analysis of time series. (see https://de.wikipedia.org/wiki/Gleitender_Mittelwert)

Confidence Interval

A confidence interval (also called expectation range) is an interval from statistics that specifies the precision of the position estimation of a parameter (e.g. an average value). The confidence interval specifies the range that includes the true position of the parameter with a certain probability (the confidence level) when a random experiment is repeated endlessly.

A commonly used confidence level is 95%. When calculating one and the same confidence interval, its interval limits include the true parameter in 95% of cases and do not include it in 5% of cases. (see https://de.wikipedia.org/wiki/Konfidenzintervall).

Mean Value

Mean values are most commonly used in statistics, where mean or average usually means the arithmetic mean. The mean value is a characteristic value for the central tendency of a distribution. If the wording is inaccurate, the terms mean value and expected value are often used synonymously, but the expected value is based on the theoretical expected frequency, while the (arithmetic) mean value is determined from concrete data (see https://de.wikipedia.org/wiki/Mittelwert). Unless explicitly stated otherwise, the arithmetic mean is used for this invention.

Process Valve, Control Valve

Process valves, also known as control valves, are used to throttle or control fluid flows. For this purpose, a throttle body or valve element is moved in a flow opening of a valve seat by means of a drive or an actuator.

Valve Seat Integrity

Valve seat integrity means the sufficient tightness of the valve seat of a process valve. The valve element often has an annular contour that engages a seat ring in the valve body. If the valve seat shows signs of wear or damage, i.e. can no longer be regarded as intact, the valve seat may no longer be sufficiently leak-proof. The seat integrity must then be regarded as inadequate.

REFERENCE NUMERALS 100 control or process valve
105 valve housing
110 upstream side
115 downstream side
120 valve element
125 valve seat
130 valve stem or actuator stem
140 stuffing box or seal
145 fluid drive
150 compressed air chamber
155 upper chamber
160 spring
165 plate
170 membrane
175 actuator housing seal
180 signal detector

REFERENCES CITED

Patent Literature

EP 2 646 723 B1
EP 315 391 B1

The invention claimed is:

1. A method for detecting inadequate valve seat integrity of a control valve having a control element, said method comprising:
    obtaining a calibration data set, wherein a position of the control element of the control valve in a closed position is repeatedly measured and recorded during a time interval;
    calculating a mean value and a standard deviation of the position of the control element in the closed position from the calibration data set;
    measuring, during continued operation of the control valve, the position of the control element in the closed position, and recording a measured position of the control element in the closed position;
    continuously determining a moving average value over a specified number of positions measured during further operation;
    determining a threshold for the moving average value from the mean value and the standard deviation of the position of the control element from the calibration data set and the specified number;
    outputting a message if the moving average value deviates from a mean value of the calibration data set by more than the threshold,
    wherein, if during a further time interval, the moving average value deviates multiple times from the mean value of the calibration data set by more than the threshold, a straight line is formed from the positions measured during the further time interval,
    wherein a gradient and an axis section of the straight line are determined, and
    a message is output if at least one of the gradient of the straight line is larger than a quotient of the threshold and a length of the further time interval or the axis section deviates from a calibration axis section from the calibration data set by more than the threshold.

2. The method according to claim 1, wherein the control valve includes a hard valve seat.

3. The method according to claim 1, wherein the threshold is defined by a confidence interval of the moving average value.

4. The method according to claim 1, wherein the control valve has a control module, and wherein the method is performed by the control module of the control valve.

5. The method according to claim 1, wherein the control valve has a control module, and wherein the method is performed by at least one device that is connected to the control module of the control valve by a network.

6. A control valve having means for performing a method according to claim 1.

7. The method according to claim 1, wherein the method steps are formulated as program code, with which the method is executable on at least one computer.

8. A control valve comprising:
a positionable valve element;
means for measuring and recording a position of the valve element in the closed position, wherein the position of the valve element is measured and recorded on entering the closed position;
means for calculating a mean value, a moving average value, and an associated standard deviation from more than one recorded position;
means for determining a time interval, wherein the position of the control element of the control valve in the closed position is repeatedly measured and recorded during the time interval in order to obtain a calibration data set;
wherein the mean value and the standard deviation of the position of the control element in the closed position are calculated from the calibration data set;
wherein a moving average value is continuously determined over a specified number of measured positions; and
wherein a threshold for the moving average value is determined from the mean value and the standard deviation of the position of the control element from the calibration data set and the specified number; and
means for outputting a message, wherein the means for outputting a message are configured such that a message about inadequate valve seat integrity is outputted if the moving average value deviates by more than the threshold from the mean value of the calibration data set,
wherein, if during a further time interval, the moving average value deviates multiple times from the mean value of the calibration data set by more than the threshold, a straight line is formed from the positions measured during the further time interval,
wherein a gradient and an axis section of the straight line are determined, and
the message is output if at least one of the gradient of the straight line is larger than a quotient of the threshold and a length of the further time interval or the axis section deviates from a calibration axis section from the calibration data set by more than the threshold.

9. The control valve according to claim 8, further comprising:
a control module, wherein the means for measuring and recording the position of the valve element in the closed position, for calculating a mean value, a moving average value and an associated standard deviation from recorded positions, for determining and/or specifying time intervals and for outputting a message are provided by the control module.

10. The control valve according to claim 8, further comprising:
a control module, wherein the means for measuring and recording the position of the valve element in the closed position, for calculating a mean value, a moving average value and an associated standard deviation from recorded positions, for determining and/or specifying time intervals and for outputting a message are provided by at least one device that is connected to the control module by a network.

11. A non-transitory storage medium, on which a data structure is stored, wherein the data structure performs the method according to claim 1 after having been loaded into at least one of a memory of a processing unit, a microcontroller, DSP, FPGA or computer in a network.

12. A control module for a control valve, comprising:
means for performing the method according to claim 1.

* * * * *